April 17, 1934.  R. C. MEALEY  1,955,010
GRAIN REDUCING MACHINE
Filed March 28, 1932  3 Sheets-Sheet 1
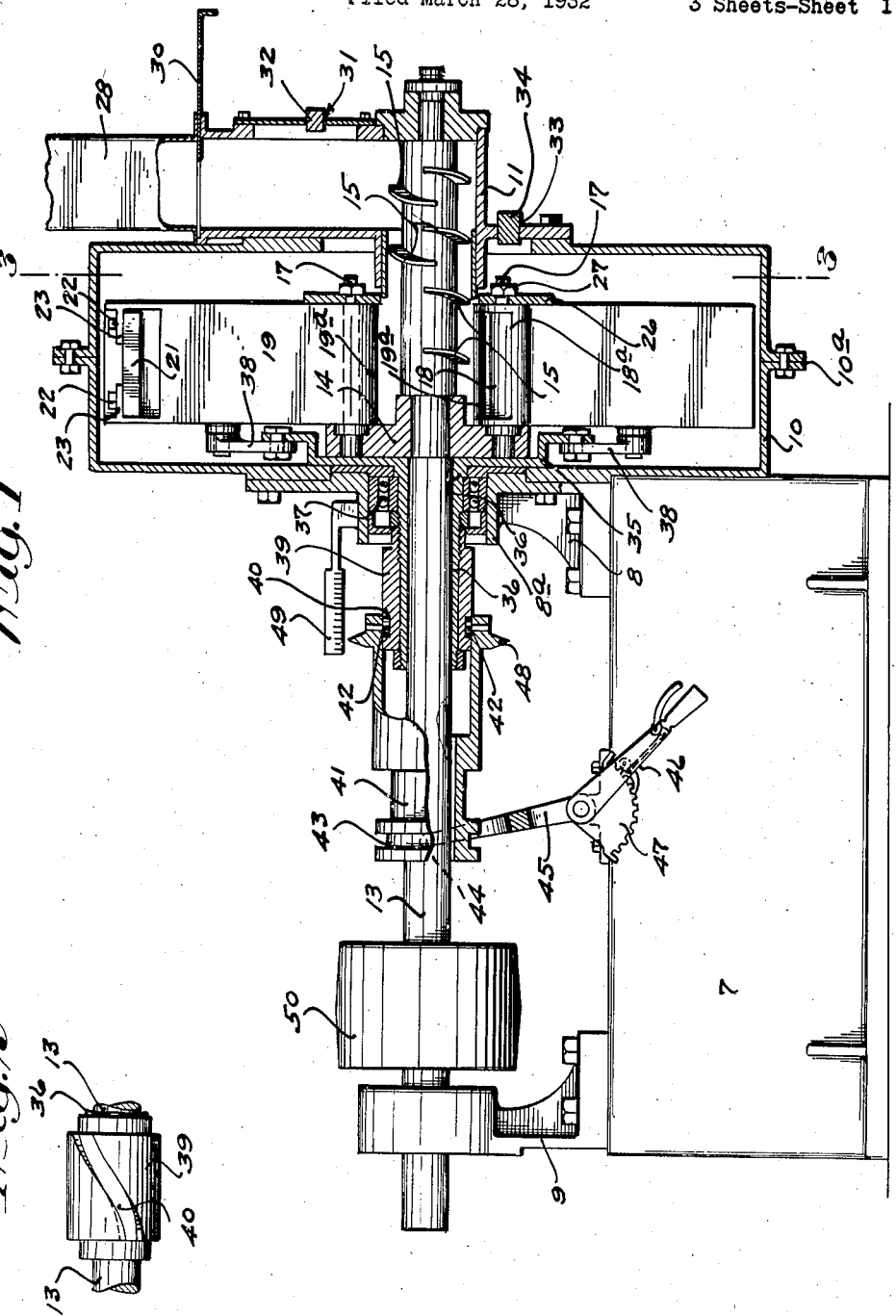
Inventor
Robert C. Mealey
By his Attorneys
Michael & Kilgore April 17, 1934.  R. C. MEALEY  1,955,010
GRAIN REDUCING MACHINE
Filed March 28, 1932   3 Sheets-Sheet 2

Inventor
Robert C. Mealey
By his Attorneys

April 17, 1934.　　　R. C. MEALEY　　　1,955,010
GRAIN REDUCING MACHINE
Filed March 28, 1932　　　3 Sheets-Sheet 3
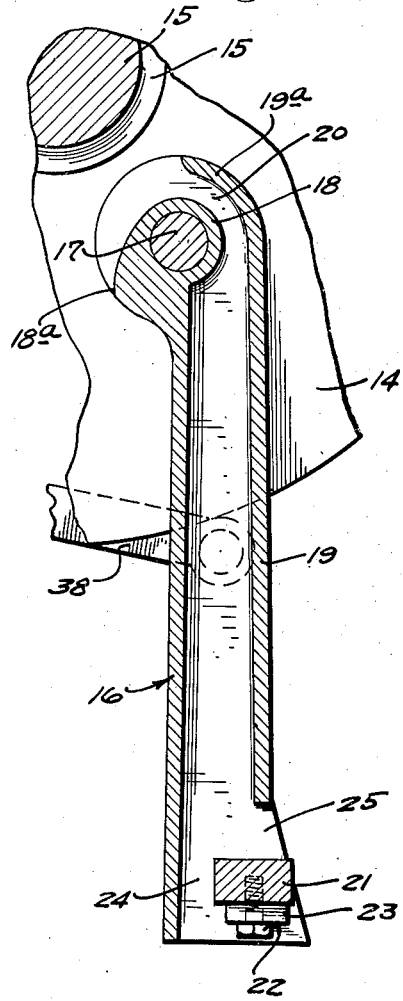
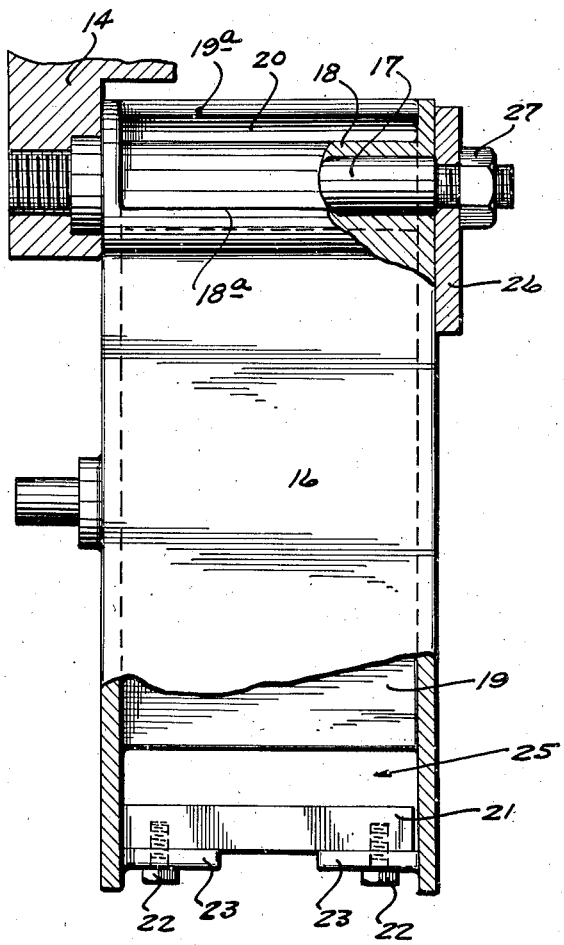
Inventor
Robert C. Mealey
By his Attorneys

UNITED STATES PATENT OFFICE 1,955,010

GRAIN REDUCING MACHINE

Robert C. Mealey, Minneapolis, Minn.

Application March 28, 1932, Serial No. 601,523

8 Claims. (Cl. 83—11)

My present invention provides an extremely simple and highly efficient machine for the reduction of grain and other solid particles and, generally stated, consists of the novel devices, combinations of devices and arrangement of parts hereinafter described and defined in the claims.

Particularly, the machine was designed for the hulling of oats and the cracking of corn and other grain where cracking is desired to reduce the grain to a small broken granular or even pulverized form. The cracking action is produced by violently throwing the grain, under the action of centrifugal force, against hard surfaces herein designated as anvils, and this invention especially involves a novel arrangement of centrifugally acting projecting means and cooperating anvils. The projecting means comprises a rotary head and a plurality of projecting or ejecting tubes, carried by said head and provided at their outer or delivery ends with grain intercepting anvils. Means is provided for adjusting the angle of the projecting tubes in respect to true radial lines radiating from the axis of the rotary head or tube carrying means so that the intensity of the impact of the grain against the anvils can be varied irrespective of the speed of rotation of the tube carrying head. Such adjustments adapt the machine to be regulated for different cracking actions, such as the hulling of oats without breaking up of the oat kernels or the cracking or breaking up of hulled corn.

In the accompanying drawings, which illustrate a commercial form of the device, like characters indicate like parts throughout the several views.

Referring to the drawings:

Fig. 1 is a view partly in side elevation but chiefly in vertical axial section showing the complete machine;

Fig. 2 is a detail view in plan, showing one of the cam-acting elements adjusting the angle of the projecting tubes;

Fig. 5 is a fragmentary enlarged section taken on the line 5—5 of Fig. 1; and

Fig. 6 is a rear elevation of the parts shown in Fig. 5, looking at the same from the left to the right, with some parts being broken away.

Figure 3:
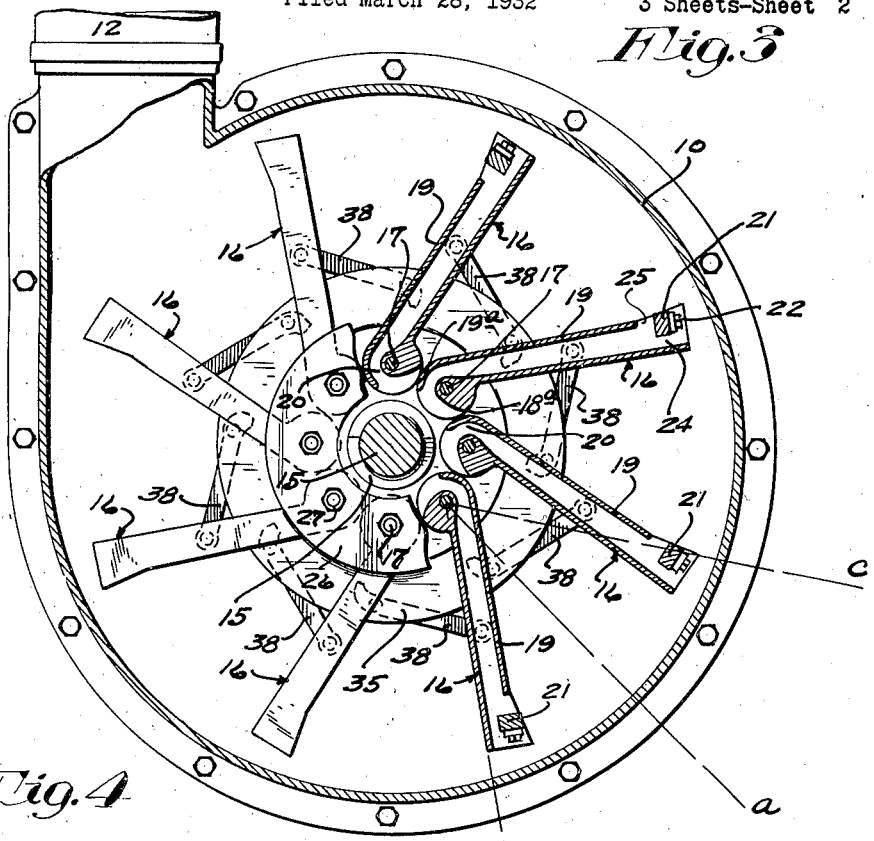
Fig. 3 is a transverse vertical section taken approximately on the line 3—3 of Fig. 1.
Figure 4:
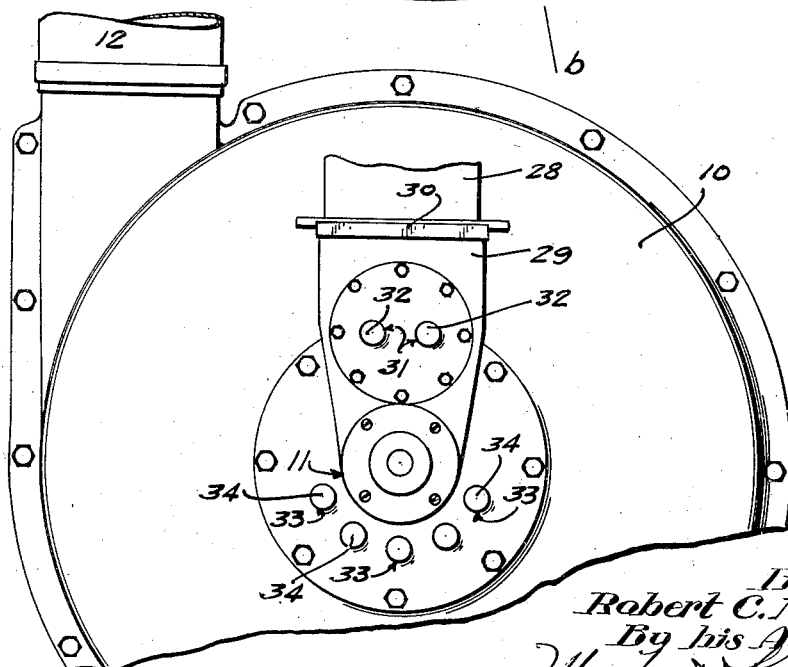
Fig. 4 is a front elevation of the machine, some parts being broken away.

The parts of the machine may be mounted on any suitable base but, as shown, are mounted on a cast box-like base 7. Rigidly secured on the top of the base 7 are bearing brackets 8 and 9. An approximately cylindrical casing 10 is rigidly secured to the bearing 8 at the front end of the base 7. This casing, as shown, is made up of two sections rigidly connected at 10ª. The casing 10 is provided with an axial sleeve-like inlet 11 and with a tangential outlet 12.

A main shaft 13 is extended through and journaled in the bearings 8 and 9 and within the casing is provided with a tube carrying head 14. Forward of the head 14, shaft 13 is extended through the inlet tube 11 and is provided with spirally disposed feed blades 15 and 15ª. The blades 15ª extend preferably through slightly more than 180° and are separated to form gaps. The blades 15ª preferably extend about 180°.

The grain projecting or ejecting tubes, which constitute important features of this invention, are indicated as entireties by the numeral 16 and they are circumferentially spaced in respect to the head 14 and radiate therefrom. At their inner ends, the tubes 16 are pivoted on trunnions 17, that are rigidly secured to and project laterally from the head 14. Immediately surrounding the trunnions 17, the tubes are provided with sleeve-like hubs 18 which, for a minor purpose that will presently appear, are formed with thickened portions 18ª. The machine is designed for rotation of the head 14 in a clockwise direction in respect to Figs. 3 and 5. The rear walls 19 of the tubes 16, at the inner ends of the tubes, are curved at 19ª concentric to the cooperating axes of the cooperating trunnions 17 and these curved portions are spaced from the sleeves 18 so as to form somewhat contracted entrance channels 20. It will now be noted, by reference to Fig. 3, that when all of the tubes are connected to the head 14, their inner end portions are substantially in contact so that they form a grain-receiving space inward thereof and immediately around that portion of shaft 13 that is provided with spiral blades 15ª. The rear walls 19 of the tubes 16 are terminated considerably short of the extreme outer ends of the tubes and the said tubes are provided radially outward of the terminal edges of said rear walls 19 with anvils 21, preferably formed by hard steel bars detachably secured by machine screws 22 to lugs 23 on the side walls of the tubes. These anvil bars 21 are spaced from the front walls of the tubes 16 to afford grain discharge passages 24 and are spaced from the outer edges of the walls 19 to afford grain discharge passages 25. Also it is highly important to note that the said anvil bars are so located that their medial portions are located in direct line with the inner surfaces of said tube walls 19 so that grain following the latter will be projected directly against said anvil bars.

By reference particularly to Figs. 1 and 6, it will be noted that the trunnions 17 have threaded ends that extend from the tube sleeves 18 through a spacing and retaining ring 26 and are provided with nuts 27 tightly screwed against said spacing ring so as to clamp the latter against shouldered portions of said trunnions. The ring 26 holds the tubes against lateral displacement but is not actually clamped against the same.

The grain may be delivered to inlet sleeve 11 and to the blade-equipped portion of the shaft 13 in various different ways but, as shown, it is delivered from the supply spout 28 to a hopper 29, the lower portion of which is directly connected to the sleeve 11 so that said hopper directly delivers to said sleeve and to the blade-equipped portion of shaft 13. The numeral 30 indicates a sliding gate that works at the top of the hopper and at the bottom of the spout 28 to regulate the flow of grain to the hopper. As it will hereinafter appear, the tube-equipped head, in addition to its function as a cracking means, has a fan or blower action, when rotated; and hence means is provided for regulating the supply of air to the casing 20. This regulation may be provided in various different ways but, as shown, the hopper is provided with a plurality of air ports 31 adapted to be closed more or less by plugs, such as corks 32; and the front wall of the casing adjacent to the tube 11 is provided with a plurality of air ports 33, certain of which are adapted to be closed by plugs, such as corks 34.

As before indicated, means is provided for simultaneously adjusting the several grain projecting tubes so as to vary their angle in respect to true radial lines radiating from the axis of the shaft 13 and head 14. This adjusting means is preferably such that the adjustment of the tubes may be accomplished while the machine is in action, and, as shown, comprises a disk-like supplemental head 35 mounted between the back of the head 14 and the rear wall of the casing 20 and provided with a long sleeve 36 that is directly journaled on shaft 13. In this arrangement, the anti-friction bearings, namely a ball bearing 37 is interposed directly between the sleeve 36 and the sleeve-like portion 8ª of bearing 8. The main or carrying head 14 and the supplemental head 15 will rotate together except for the oscillatory movements of the latter in respect to the former, and which relative movement is produced only in varying the adjustments of the several tubes 16. Said tubes 16 are independently connected to the supplemental or adjusting head 35 by links 38.

Rigidly secured on the rearwardly projecting portion of the sleeve 36 and hence, of course, rotatable therewith, is a cam-acting sleeve 39 formed with spiral grooves 40. Keyed for rotation with but free for axial adjustments on the shaft 13, is a sleeve 41 provided with an enlarged portion that embraces or telescopes over the sleeve 39 and is provided with cam-acting projections, such as roller-equipped studs 42, that work in the spiral grooves 40 of sleeve 39. At its rear end, sleeve 41 is provided with an annular groove 43, in which works the inwardly projecting pins 44. A forked shifter lever 45 which, by a latch-equipped hand lever 46, is adapted to be locked in different positions to a lock segment 47, shown as rigidly secured on the base 7. In the arrangement illustrated, the sleeve 41 is provided with a pointer in the nature of an annular flange 48 that works adjacent a graduated scale 49, that is rigidly secured to and projects from the sleeve 8ª of bearing 8.

As a means for driving shaft 13 and rotating the head 14, said shaft, as shown, is provided with a pulley 50, over which a power-driven belt, not shown, is adapted to be run.

Operation

In the operation of the machine, the shaft 13 and hence the tube-carrying head 14 will be driven at high speed. In practice, with the machine illustrated, said parts have with best results been driven at a speed of approximately 2600 revolutions per minute, but of course, this speed can be greatly varied. An important point is, however, that the cracking action as will hereinafter more fully appear, can be varied without varying the speed of rotation.

Under rotation of the shaft 13, the blades 15 and 15ª will deliver the grain from the hopper 29 into the annular space between the shaft and the pivotally mounted inner ends of the tubes 16 and by centrifugal force asserted by the crowding action of the feed device, the grain will be caused to enter the several tubes through the passages 20 thereof. Under the action of centrifugal force, the grain will be caused to hug the inner surfaces of the rear walls 19 of the several tubes and to travel under high velocity along the same until the grain particles are projected under very high velocity directly against the medial portions of the anvil blocks or strips 21. The hulling or cracking action, as the case may be, is of course produced by the violent impact produced by the throwing of the grain particles against the anvils. The cracked or hulled particles will be deflected from the anvils and will find outward escape both through the passages 24 and 25, generally chiefly through the former. It will be noted that the tubes as preferably designed, are slightly tapered so that the cross section of their interiors increase outward in a radial direction.

This produces a gradually decreasing air pressure within the tubes and a resistance to the travel of the grain that gradually decreases as the grain approaches the outer edges of the rear walls 19 of the tubes.

As already indicated, in a machine designed to rotate in a clockwise direction in respect to Fig. 3, the tubes are capable of very considerable angular adjustments in respect to line $a$, Fig. 3, that is a true radius radiating from the axis of the shaft 13 and intersecting the axis of the pivot of the particular tube. While this angular adjustment may vary, it may be assumed in the present instance to vary from the line $b$, to line $c$ of Fig. 3. When the tubes are adjusted backward in respect to the direction of travel, say to the line $c$, the most rapid discharge of the grain and hence the most intense impact between the grain and the anvils will be produced. When the device is adjusted forward in respect to the direction of rotation say to the line $b$, a minimum or much less rapid discharge of grain and hence intense impact between the same and the anvils will be produced. In practice, I have found that for the hulling of oats, the tubes should be adjusted approximately to the position represented by the line $a$. The hulling of oats should produce impacts such as will crack and open the hulls without breaking or cracking the oat particles. In the treatment of oats, I have found that under centrifugal force and the forward pressure produced thereon by the inner surfaces of the walls 19 of the tubes, the oat will be caused to not only flatten out against said surface, but their heavy ends will be turned forward so that these heavy ends will strike the anvils and will be opened up and separated from the oat kernels in the most efficient way and without tearing the oat hulls to pieces or disintegrate the oat hulls to any considerable extent. For the cracking of hard grain or corn, the tubes should be adjusted to or toward the positions indicated by the line b. By the various adjustments of the tubes, any desired kind of cracking action can be produced.

In the reduction of hulled corn, the first cracking action will break open the kernels and some of the particles will be quite finely broken, while others will be left in coarse condition. By the proper separation of the fine and coarse particles of the broken corn, by the use of screens or the like, after the first cracking action or any other cracking action for that matter, the relatively fine and coarse particles can be separated and the coarse particles run through the machine for further cracking action until the proper reductions and separations have been made.

It is further important to note that with the machine as designed, the adjustments of the tubes can be simultaneously produced without stopping the machine and while the machine is in operation, simply by the manipulation of the lever 46. By movement of the lever 46 and arm 45, the shipper head 41 may be moved axially toward or from the casing 10, thereby causing the roller-equipped studs 42 to travel in the spiral grooves 40 of the sleeve 39 which causes the said sleeve and hence the disk-like supplemental head 35 to move rotatively in respect to the head 14 and thereby produce the above noted angular adjustments of the several tubes. The indicator 48—49 will indicate to the operator the relative angular adjustments of the several tubes so that after a little experience the operator will know just about the kind of work that the tubes are set to produce in any position of the flange 48 in respect to the scale 49.

The arrangement of the tubes radiating from the carrying head and provided with anvils at their outer or delivery ends is a highly important feature of this invention and is considered broadly new; and broadly, the arrangement of the radial tubes mounted for angular adjustments to vary the intensity of the cracking action is considered broadly new as a highly important feature of this invention and both of the said features are herein broadly claimed. In actual practice the efficiency of this machine has been thoroughly demonstrated for the hulling of oats, cracking of corn and other grains and generally for the reduction or grain or like granular materials.

It is important that the rear walls 19 of the tubular members 16 should be not only smooth but wide and quite flat so that the grain will have a chance to spread out and to move freely outward on the same under the action of centrifugal force. For the above reason the tubes are best made rectangular and wide in cross-section as compared with their depth or thickness in the direction of rotation.

When the head with its tubular blades are rotated, they act as a fan or blower which will create a blast of air sufficient to carry the reduced stock or material outward through the discharge spout 12. The intensity of this blast as indicated, may be varied by removing more or less of the plugs or corks 32 and 34 from the ports or air holes normally closed thereby. These air ports and plugs constitute only one of the many different ways of regulating the draft. A part but only a small part of the air should be taken in with the grain or material to be reduced and the air thus introduced is, of course, regulated by the removal of the plugs or corks 32. The non-continuous or broken spiral blades 15 permit a limited flow of air with the grain, but prevents such free flow that the air draft will blow the grain ahead of the blades. It is important that the rotary parts be well balanced to prevent vibration and this may be accomplished by grinding off more or less of the thick outer hub portions 18ª of the tubes.

What I claim is:

1. In a machine of the kind described, a rotary head provided with radiating members for guiding and projecting the material to be reduced and provided at their outer ends with anvil surfaces against which the material will be discharged under the action of centrifugal force, said members having discharge passages in the vicinity of and on both sides of said anvil surfaces.

2. In a machine of the kind described, a rotary head provided with radiating members for guiding and projecting the material to be reduced and provided at their outer ends with anvil surfaces against which the material will be discharged under the action of centrifugal force, said members having discharge passages in the vicinity of and on both sides of said anvil surfaces, and feed means for delivering the material axially to said head and to the receiving inner ends of said members.

3. In a machine of the kind described, a rotary head provided with radiating members for guiding and projecting the material to be reduced and provided at their outer ends with anvil surfaces against which the material will be discharged under the action of centrifugal force, said members having discharge passages in the vicinity of the said anvil surfaces, said radial members being angularly adjustable forwardly and rearwardly in respect to the direction of rotation of said head.

4. In a machine of the kind described, a rotary head provided with radiating members for guiding and projecting the material to be reduced and provided at their outer ends with anvil surfaces against which the material will be discharged under the action of centrifugal force, said members having discharge passages in the vicinity of the said anvil surfaces, and feed means for delivering the material axially to said head and to the receiving inner ends of said members, said radial members being angularly adjustable forwardly and rearwardly in respect to the direction of rotation of said head.

5. In a machine of the kind described, a rotary head provided with radiating tubular members for guiding and projecting the material to be reduced, said tubular members being angularly adjustable forwardly and rearwardly in respect to the direction of rotation of said head, and means for delivering the material to be reduced into the inner ends of said tubular member, said tubular members have flat rear walls against which the material will be caused to travel under centrifugal force produced by rotation of said head, said tubular members having anvil surfaces spaced from the front and rear walls thereof at the outer ends of said tubular members.

6. The structure defined in claim 4 in further combination with manually operated means connected to said radiating members for angularly adjusting the same while said head is under rotation.

7. The structure defined in claim 4 in further combination with manually operated means connected to said radiating members for angularly adjusting the same while said head is under rotation, said means including a supplemental head co-axially with said main head and rotatable with but rotatable adjustably in respect thereto, a sleeve thereto, a sleeve connected to said supplemental head and having an oblique cam groove, a second sleeve keyed to rotate with said main head but axially adjustable in respect thereto and provided with cam-acting projections engaging the cam groove of said first noted sleeve, and means for axially adjusting said second sleeve while it is being rotated with said first noted head.

8. In a machine of the kind described, a rotary head provided with radiating members for guiding and projecting the material to be reduced and provided at their outer ends with anvil surfaces against which the material will be discharged under the action of centrifugal force, said members having discharge passages in the vicinity of the said anvil surfaces, said radiating members being angularly adjustable, and in further combination with connections for angularly adjusting said members while said head is under rotation.

ROBERT C. MEALEY.